United States Patent [19]

Ohta

[11] Patent Number: 5,265,125
[45] Date of Patent: Nov. 23, 1993

[54] SIGNAL DETECTION APPARATUS FOR DETECTING DIGITAL INFORMATION FROM PCM SIGNAL

[75] Inventor: Haruo Ohta, Hirakata, Japan

[73] Assignee: Matsushita Electric Industrial Co., Ltd., Osaka, Japan

[21] Appl. No.: 791,533

[22] Filed: Nov. 14, 1991

[30] Foreign Application Priority Data

Nov. 16, 1990 [JP] Japan ............................ 2-311735
Nov. 16, 1990 [JP] Japan ............................ 2-311736

[51] Int. Cl.⁵ .................................. H04L 27/01
[52] U.S. Cl. ................................ 375/11; 375/18; 375/101; 360/65
[58] Field of Search .............. 375/11, 12, 18, 20, 375/94, 101; 329/349, 353; 360/65, 51, 46, 67

[56] References Cited

U.S. PATENT DOCUMENTS

| | | | |
|---|---|---|---|
| 3,792,356 | 2/1974 | Kobayashi et al. | 375/18 |
| 4,278,992 | 7/1981 | Christopher | 375/94 |
| 4,543,531 | 9/1985 | Sugita et al. | 375/94 |
| 4,571,734 | 2/1986 | Dolivo et al. | 375/18 |
| 5,093,843 | 3/1992 | Hirosaki et al. | 375/11 |
| 5,166,955 | 11/1992 | Ohta et al. | 375/11 |

OTHER PUBLICATIONS

"Performance Analysis of Partial Response Systems for Nonreturn-To Zero Recording", Hisashi Osawa et al., IEEE Transactions On Magnetics, vol. Mag-22, No. 4, Jul. 1986, pp. 253-258.

"Application of Probabilistic Decoding To Digital Magnetic Recording Systems", H. Kobayashi, IBM Journal of Research and Development, vol. 15, No. 1, Jan. 1971, pp. 64-74.

"An Experimental Study On Bit Rate Reduction and High Density Recording For a Home Use Digital VTR", Chojuro Yamamitsu et al., IEEE Transactions on Consumer Electronics, vol. 34, No. 3, Aug. 1988, pp. 588-596.

"Principles of Data Communication", Lucky et al., McGraw-Hill Book Company, pp. 82-85.

*Primary Examiner*—Curtis Kuntz
*Assistant Examiner*—T. Ghebretinsae
*Attorney, Agent, or Firm*—Wenderoth, Lind & Ponack

[57] ABSTRACT

A signal detection apparatus detects original information from a PCM signal transmitted through a communication channel or reproduced from a recording medium. The apparatus includes: a first equalizer for equalizing the PCM signal so as to decrease intersymbol interference, a clock regenerator for regenerating a clock signal synchronized with a timing of the digital information from an output of the first equalizer; an amplitude detector for detecting an amplitude from the output of the first equalizer and the clock signal; a second equalizer for equalizing the output of the first equalizer to a partial-response equalized signal, and a detecting circuit for detecting the original digital information at a clock timing of the clock signal from the partial-response equalized signal. Accordingly, without being influenced by the amplitude fluctuations of the signal, the original digital information can be detected at a low bit error rate.

6 Claims, 6 Drawing Sheets

SIGNAL DETECTION APPARATUS FOR DETECTING DIGITAL INFORMATION FROM PCM SIGNAL

BACKGROUND OF THE INVENTION

1. Field of the Invention

The present invention relates to a signal detection apparatus for detecting original digital information from a pulse code modulated (PCM) signal transmitted through a communication channel or reproduced from a recording medium.

2. Description of the Prior Art

As the method for detecting signal from a PCM signal transmitted through a communication channel or reproduced from a recording medium, for example, it is known to detect an original digital signal after partial-response equalization to cause a specific intersymbol interference preliminarily (e.g. H. Osawa et al., "Performance Analysis of Partial Response Systems for Non-return-to-Zero Recording," IEEE Transactions on Magnetics, Vol. MAG-22, No. 4, July 1986). When detecting original digital information from a signal after partial-response equalization, a method of using a Viterbi decoding which is one of the maximum-likelihood decoding methods is known (e.g. H. Kobayashi, "Application of Probablistic Decoding To Digital Magnetic Recording Systems," IBM Journal of Research and Development, Vol. 15, No. 1, January 1971, pp. 64-74). In these methods, it is possible in a channel having a large intersymbol interference such as a magnetic recording channel to detect signals at a low bit error rate, in comparison with the method of decoding the original digital information by equalizing so as to suppress the intersymbol interference. An example of applying this detecting method to a digital VCR is disclosed by C. Yamamitsu et al. in "An Experimental Study on Bit Rate Reduction and High Density Recording for a Home-use Digital VTR," IEEE Transactions on Consumer Electronics, Vol. 34, No. 3, August 1988, pp. 588-596.

Incidentally, to detect original digital information from a partial-response equalized signal, the amplitude at the moment of detecting the equalized signal must be kept constant. Fluctuations of signal amplitude will increase the detection error. Accordingly, to keep constant the signal amplitude, an automatic gain control (AGC) circuit is used. The AGC circuit detects the envelope level of the equalized signal, and it is designed to control the gain controlled amplifier so as to keep the detected envelope level constant.

However, the level of the envelope does not always accurately express the amplitude at the detecting moment of the signal, but varies with the content of the transmitted digital information sequence. Therefore, in such method of keeping constant the level of the envelope, the detection error may be increased.

SUMMARY OF THE INVENTION

It is hence a primary object of the invention to present a signal detection apparatus capable of detecting digital information accurately even if the signal amplitude fluctuates.

It is another object of the invention to present a signal detection apparatus which does not increase the detection error even if the level of the envelope varies depending on the content of the transmitted digital information sequence.

It is still another object of the invention to present a signal detection apparatus capable of easily reproducing a stable clock signal, and low in the rate of detection errors due to the reproduction error of clock signal.

It is a further object of the invention to present a digital information detection apparatus capable of equalizing partial response accurately, and low in the rate of detection errors due to the equalization error.

To achieve the above objects, the invention presents a signal detection apparatus which comprises: a first equalizing means for equalizing a PCM signal transmitted through a communication channel or reproduced from a recording medium so as to decrease intersymbol interference; a clock regenerating means for regenerating a clock signal from an output signal of the first equalizing means; a second equalizing means for equalizing the output of the first equalizing means to a partial-response equalized signal; an amplitude detecting means for detecting an amplitude from the output of the first equalizing means and the clock signal, and a detecting means for detecting original digital information at a clock timing of the clock signal from an output signal of the second equalizing means and an output of the amplitude detecting means.

According to the invention, having thus composed, the detecting means is controlled by the detected amplitude at the data detecting moment of the signal having reduced intersymbol interference. Accordingly, variations of the envelope amplitude depending on the content of the transmitted digital information sequence do not increase the detection error.

Moreover, preferably, the invention also presents a signal detection apparatus which comprises: an equalizing means for equalizing a PCM signal transmitted through a communication channel or reproduced from a recording medium so as to decrease intersymbol interference; a clock regenerating means for regenerating a clock signal from an output of the equalizing means; an analog-to-digital converting means for sampling and quantizing the output of the equalizing means at a clock timing of the clock signal; a digital equalizing means for equalizing an output of the analog-to-digital converting means to a partial-response equalized signal in a form of digital signal; an amplitude detecting means for detecting an amplitude from the output of the analog-to-digital converting means, and a detecting means for detecting original digital information from an output of the digital equalizing means by the Viterbi decoding method.

It is hence possible to realize accurate equalizing characteristic for partial-response equalizing by digital processing, and because of maximum-likelihood decoding by the Viterbi decoding method, digital information can be detected at a further lower detection error rate.

DESCRIPTION OF THE PREFERRED EMBODIMENTS

Figure 1:
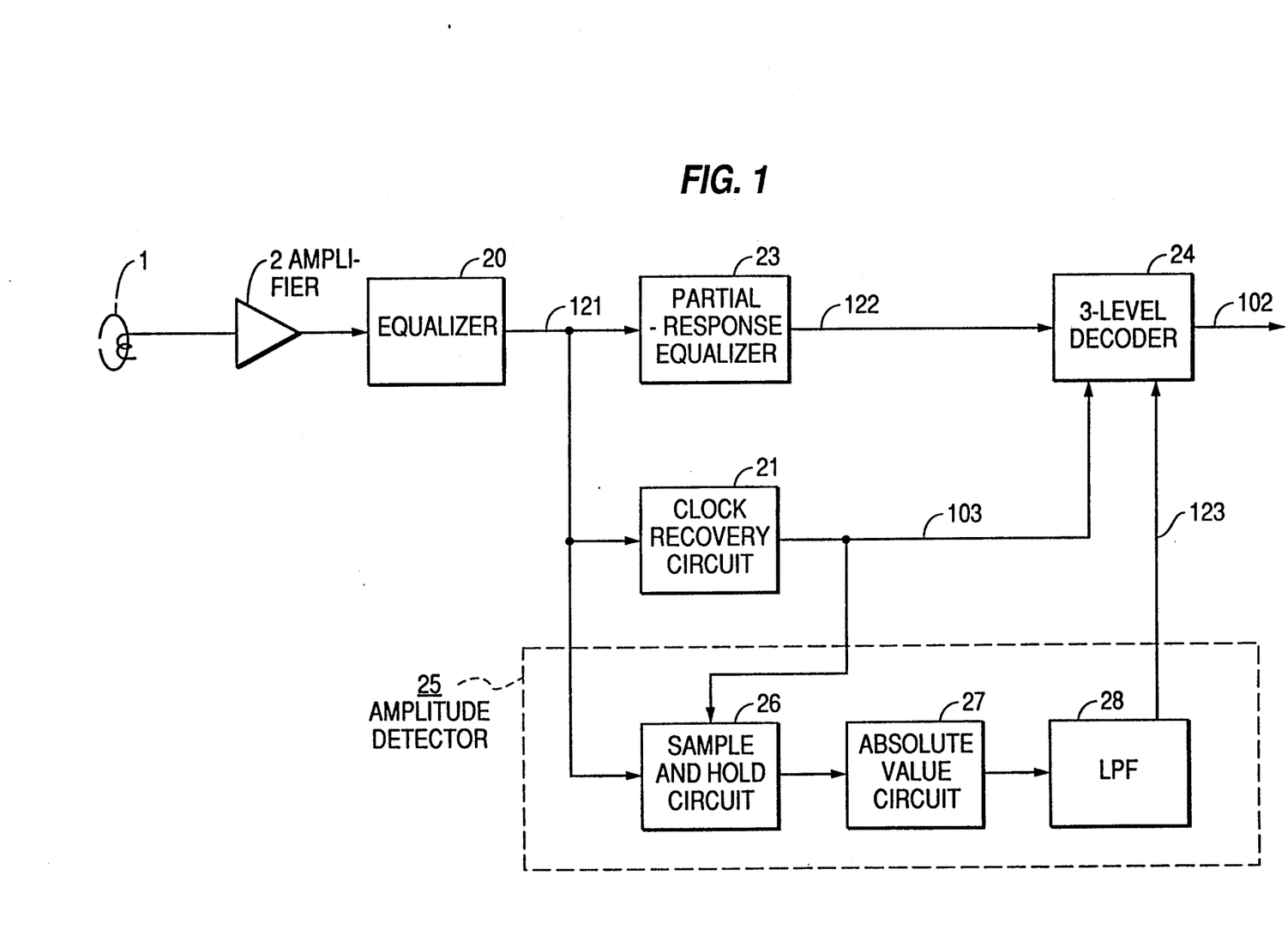
FIG. 1 is a block diagram showing a first embodiment of a signal detection apparatus in accordance with the present invention.

FIG. 1 is a block diagram showing a first embodiment of the application of a signal detection apparatus of the invention in a magnetic recording and reproducing apparatus. In FIG. 1, the PCM signal reproduced from the recording medium (not shown) is reproduced by a magnetic head 1. The reproduced signal is amplified to a necessary amplitude by an amplifier 2.

Figure 2A:
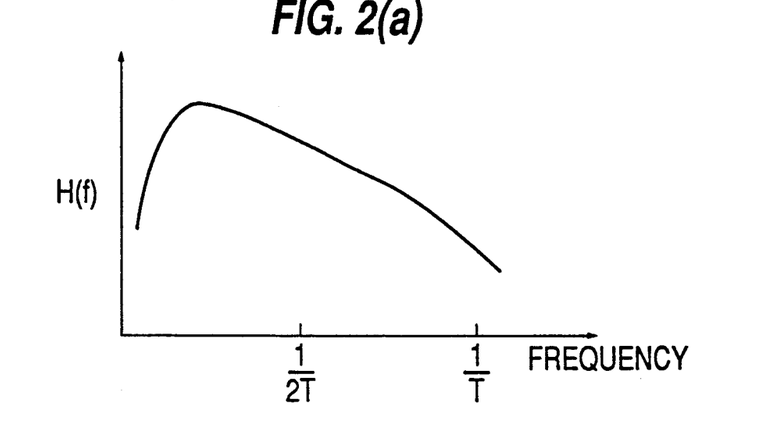
FIGS. 2(a)-2(c) are explanatory diagrams of frequency characteristics of an equalizer included in the first embodiment of the present invention.
Figure 2B:
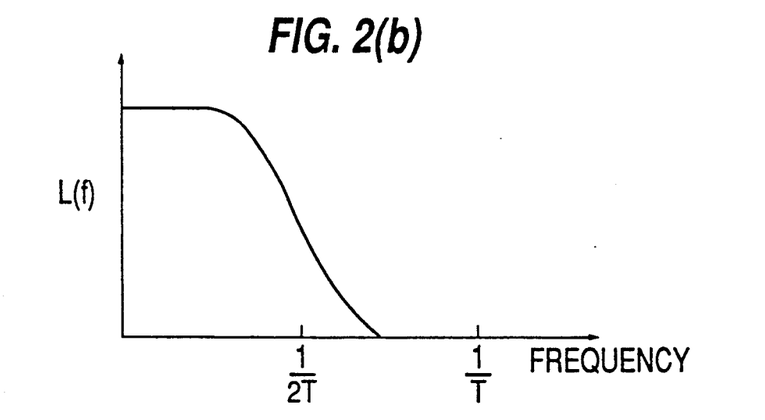

An equalizer 20 equalizes so as to reduce the intersymbol interference caused by recording and reproducing. That is, supposing the frequency characteristic of the system from recording to the head amplifier 2 to be H(f) as shown in FIG. 2(a), and the frequency characteristic to satisfy the Nyquist criterion as shown in FIG. 2(b) is assumed to be L(f). Supposing the data transmission period to be T and the roll-off rate to be a, L(f) is expressed as follows.

$$L(f) = \begin{cases} T & 0 \leq f \leq \frac{1-a}{2T} \\ \frac{T}{2}\left[1 - \sin\left(\frac{\pi}{2a}(2fT-1)\right)\right] & \frac{1-a}{2T} \leq f \leq \frac{1+a}{2T} \\ 0 & \frac{1+a}{2T} \leq f \end{cases}$$

Figure 2C:
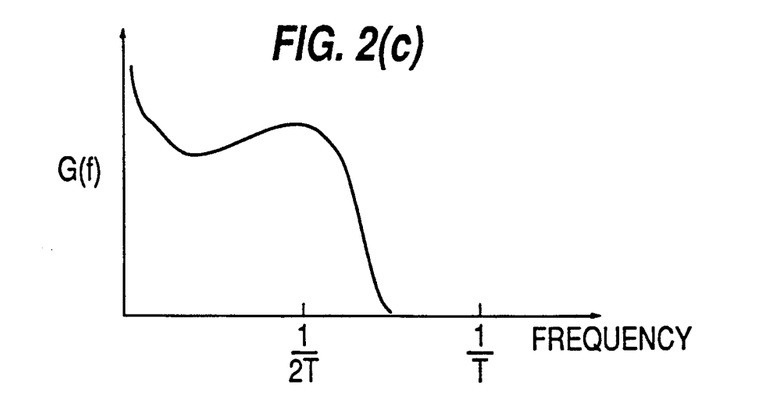

At this time, supposing the frequency characteristic of the equalizer 20 to be G(f), G(f) satisfies the relationship: G(f) = L(f)/H(f), which is the characteristic in FIG. 2(c).

Figure 3:
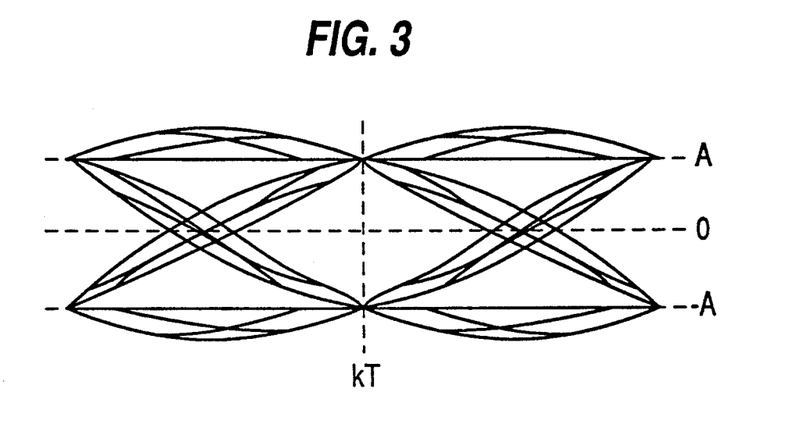
FIG. 3 is an eye pattern diagram for explaining the operation of the first embodiment of the present invention.

A signal 121 delivered from the equalizer 20 is a signal that can be expressed by a two-level eye pattern shown in FIG. 3.

The signal 121 is fed to a clock regenerating circuit 21, and a clock signal 103 synchronized with the digital information bit is obtained. Here, since the signal 121 is a signal which can be expressed by the eye pattern shown in FIG. 3 as mentioned above, a stable clock is easily obtained from the phase locked loop (PLL) circuit provided with a phase comparator for comparing the phase of the zero-crossing time.

Meanwhile, the signal 121 is also fed to an amplitude detecting circuit 25. The amplitude detecting circuit 25 is composed of a sample and hold circuit 26, an absolute value circuit 27, and a low pass filter (LPF) 28. The sample and hold circuit 26 samples the signal 121 at time kT in FIG. 3 on the basis of a clock signal 103 (T is a bit period, k is an integral number), and holds this value. As clear from FIG. 3, since sampling is effected at the time free from intersymbol interference, its amplitude will be +A or −A, regardless of the content of the digital information sequences. The output of the sample hold circuit 26 is fed to the absolute value circuit 27 to obtain the absolute value of the amplitude, and the signal is smoothed by the LPF 28, and unnecessary fluctuation components due to noise are removed, thereby obtaining amplitude information 123. The thus obtained amplitude information 123 is not changed by the content of the digital information sequence, and an accurate amplitude as indicated by |A| in FIG. 3 is presented.

Figure 4:
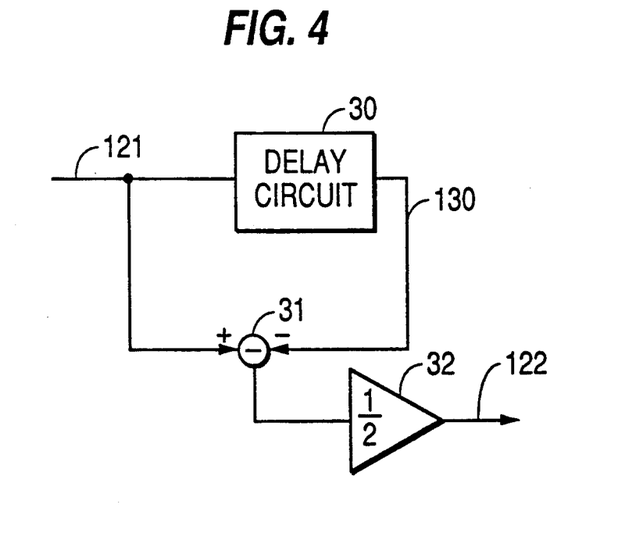
FIG. 4 is a block diagram of a partial-response equalizer included in the first embodiment of the present invention.

On the other hand, the signal 121 is also fed to a partial-response equalizer 23. The structure of the partial response equalizer is shown in FIG. 4.

Figure 5:
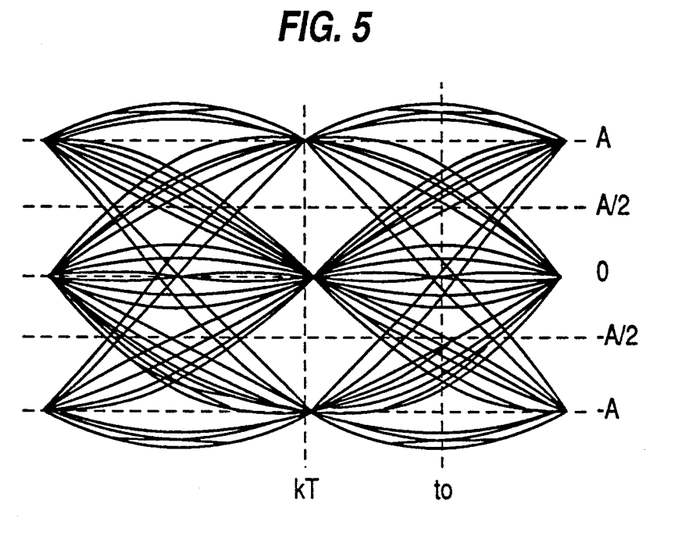
FIG. 5 is an eye pattern diagram for explaining the operation of the first embodiment of the present invention.

The signal 121 is fed to the delay circuit 30, and a signal 130 delayed by 2T (T is the bit period) is obtained. Furthermore, by a subtraction circuit 31, the signal 130 is subtracted from a signal 121, and its output is fed to a coefficient multiplier 32 to multiply the amplitude by ½ thereby obtaining a signal 122. As a result, the signal 122 is transformed into a signal equalized in the intersymbol interference to be (1, 0, −1). At this time, the signal 122 is a signal expressed by a three-level eye pattern as shown in FIG. 5.

Incidentally, this method of equalization is expressed in a polynomial form $1-D^2$ supposing the delay of the data transmission period to be D. It is sometimes also known as a partial-response class 4 method.

Back to FIG. 1, the signal 122 is fed to a 3-level decoder 24. In the 3-level decoder 24, amplitude information 123 and clock signal 103 are also fed at the same time.

Figure 6:
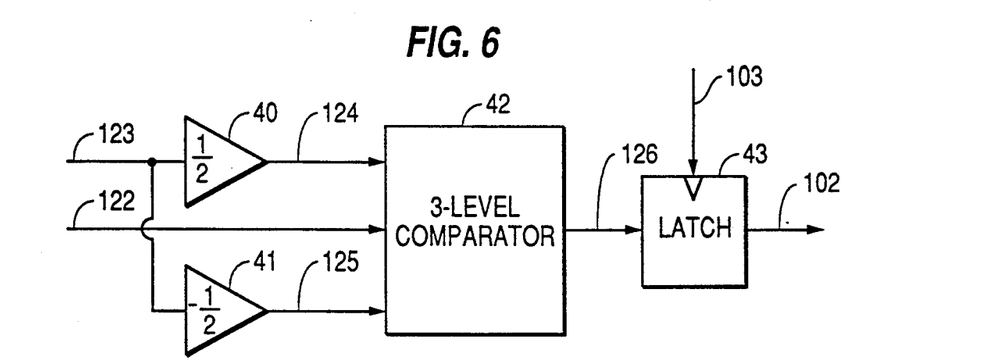
FIG. 6 is a block diagram of a 3-level decoder included in the first embodiment of the present invention.

The 3-level decoder 24 is composed as shown in FIG. 6. The partial response equalized signal 122, the threshold signal 124 having the amplitude information 123 multiplied by ½ in the coefficient multiplier 40, and the threshold signal 125 having the amplitude information 123 multiplied by −½ in a coefficient multiplier 41 are fed in a 3-level comparator 42. The 3-level comparator 42 delivers a signal 126 showing that the amplitude of the signal 122 is smaller than the amplitude indicated by the signal 124 and larger than the amplitude of the signal 125, or else. The signal 126 is latched in synchronism with the clock signal 103 in a latch circuit 43 (at time kT in FIG. 3), and a decoded original digital signal 102 is delivered.

In this way, digital information is detected from the partial-response equalized signal.

In this way, in this embodiment, since the threshold amplitude is controlled by detecting the amplitude at the data detecting moment, the original digital information may be detected accurately even if the signal amplitude varies. Besides, since the amplitude at the data detecting moment is used, instead of the envelope amplitude, it is not influenced if the envelope amplitude varies depending on the content of the digital information sequence, so that the original digital information may be stably detected.

In addition, since the clock is regenerated from the signal equalized so as to reduce the intersymbol interference, a stable clock may be reproduced easily.

A second embodiment of the invention is described below.

Figure 7:
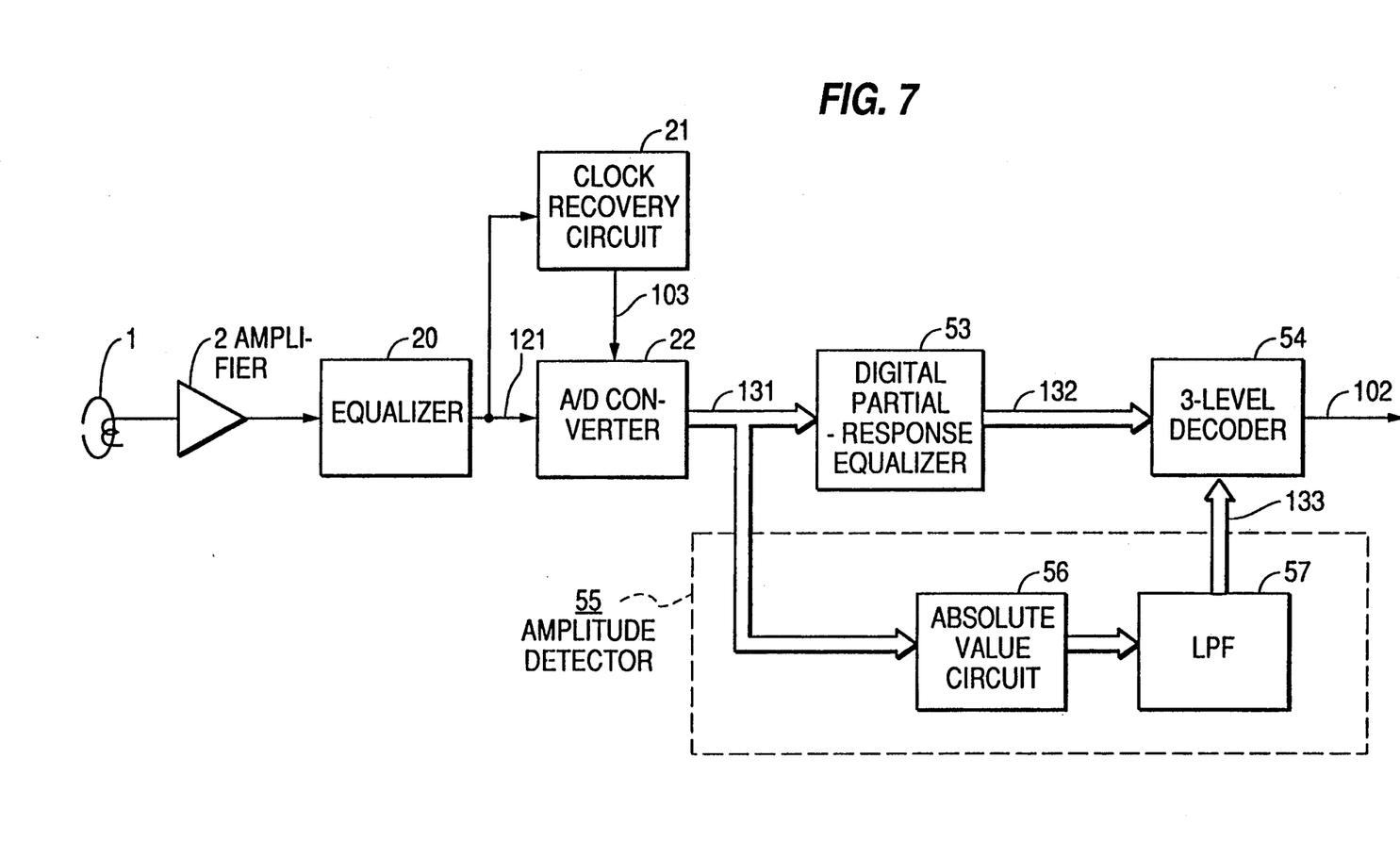
FIG. 7 is a block diagram showing a second embodiment of a digital information detection apparatus in accordance with the present invention.

FIG. 7 is a block diagram applying the signal detection apparatus of the invention in a magnetic recording and reproducing apparatus. In FIG. 7, the blocks same in constitution and function as those in FIG. 1 are identified with the same reference numbers. The operation of only the different parts from FIG. 1 is explained below.

In FIG. 7, a signal 121 equalized by an equalizer 20 so as to reduce the intersymbol interference caused by recording and reproducing is fed to an analog-to-digital A/D converter 22. The A/D converter 22 samples and quantizes the signal 121 in synchronism with a clock signal 103 synchronized with the digital information bit, thereby obtaining a signal 131.

On the other hand, the signal 131 is also fed to an amplitude detection circuit 55. The amplitude detection circuit 55 is composed of an absolute value circuit 56 and LPF 57. The absolute value of the amplitude of the signal 131 is obtained by the absolute value circuit 56, and the signal is smoothed by the LPF 57 to remove unnecessary fluctuation components due to noise, thereby obtaining amplitude information 133.

At the same time, the output signal 131 of the A/D. converter 22 is also fed into a digital partial-response equalizer 53, and is equalized so that the intersymbol interference is (1, 0, −1) in a form of a digital signal.

Figure 8:
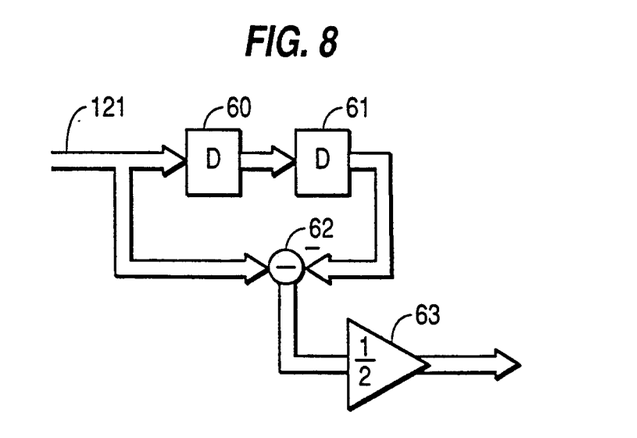
FIG. 8 is a block diagram of a digital partial response equalizer included in the second embodiment of the present invention.

A practical constitution of the digital partial-response equalizer 53 is shown in FIG. 8. It is composed of delay circuits 60 and 61 for delaying the signal by one clock period by a clock signal 103, a subtraction circuit 62 for subtracting the output signal of the delay circuit 61 from the signal 121, and a coefficient multiplier 63 for multiplying the output signal of the subtraction circuit by $\frac{1}{2}$. The thus equalized signal 122 becomes, as it is evident, a signal equivalent to the signal expressed in 3-level eye pattern shown in FIG. 5, which is same as in the first embodiment.

Back to FIG. 7, the equalized signal 132 decodes the original digital signal in a 3-level decoder 54, and delivers it as a signal 102. The 3-level decoder 54 is to realize the function of the 3-level decoder 24 in the first embodiment shown in FIG. 6 in a form of digital signal, and its constitution a detailed description therefore has been obvious and is omitted herein.

In this embodiment, thus, in addition to the same features as in the first embodiment, the partial-response equalization can be done accurately by a digital filter.

A third embodiment of the invention is described below.

Figure 9:
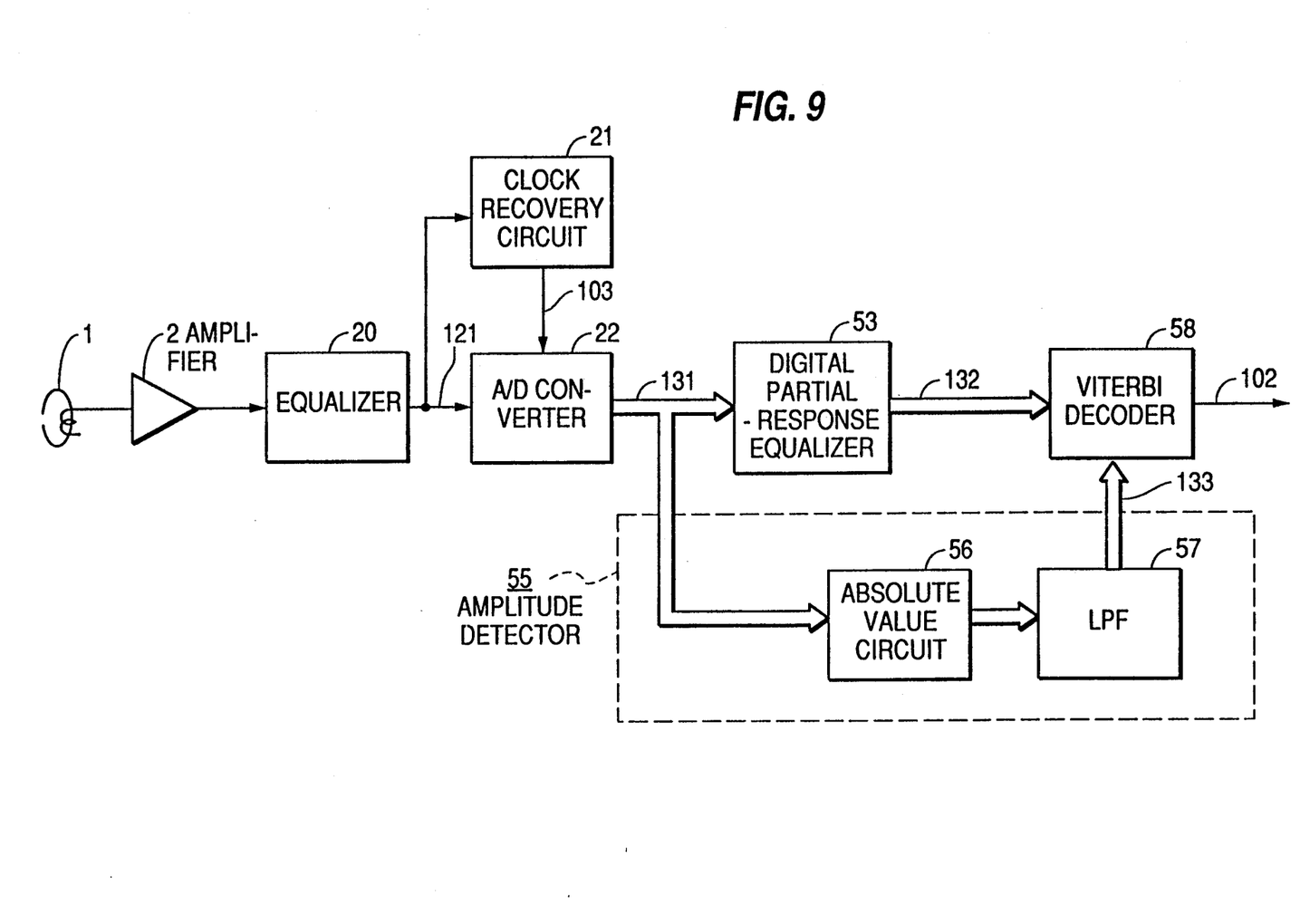
FIG. 9 is a block diagram showing a third embodiment of a digital information detection apparatus in accordance with the present invention.

FIG. 9 is a block diagram showing the third embodiment of applying the signal detection apparatus of the invention in a magnetic recording and reproducing apparatus. In FIG. 9, the blocks which are same in constitution and function as those in the embodiment in FIG. 7 are identified by the same reference numbers. What is different from the embodiment in FIG. 7 is that a Viterbi decoder 58 is used instead of the 3-level decoder 54 so as to detect the digital information by the maximum-likelihood decoding.

In the Viterbi decoder, the likelihood of the reproduced code sequence is calculated on the basis of the reference signal amplitude, and the code sequence of the maximum likelihood is selected. In this case, the reference signal amplitude denotes the signal amplitude at the data detecting moment not including noise components, which is the value of A in FIG. 5. As the reference signal amplitude to be used in the calculation of likelihood, accordingly, the amplitude information 133 detected by the amplitude detection circuit 55 is supplied to the Viterbi decoder 58.

The composition and operation of the Viterbi decoder 58 are not explained herein because they are known as disclosed, for example, by C. Yamamitsu et al. in "An Experimental Study on Bit Rate Reduction and High Density Recording for a Home-use Digital VTR," IEEE Transactions on Consumer Electronics, Vol. 34, No. 3, August 1988, pp. 588–596, and H. Kobayashi in "Application of Probablistic Decoding to Digital Magnetic Recording Systems," IBM Journal of Research and Development, Vol. 15, No. 1, January 1971, pp. 64–74.

In this embodiment, in addition to the features of the first and second embodiments, it is an excellent feature that digital information can be detected at a further lower bit error rate by the maximum-likelihood decoding method.

Meanwhile, the foregoing embodiments were examples of application of the invention in the magnetic recording and reproducing apparatus, but the invention is not limited to them alone, and it may be also applied in the detection of digital information from a communication transmission channel and detection of digital information from other recording medium, among others.

In the embodiments shown above, the partial-response equalization was effected so that the intersymbol interference is (1, 0, −1), but the invention is not limited to this operation alone, but may be applied also to partial-response equalization at an arbitrary intersymbol interference, depending on the characteristics of the transmission channel or recording medium, or restrictions of the circuit scale.

Furthermore, in the first and second embodiments, the multi-level decoder was used, while the Viterbi decoder was used in the third embodiment, but the decoding method of the invention is not limited to such methods alone, but sequential decoder and other decoders may be used as required.

What is claimed is:

1. A signal detection apparatus for detecting digital information from a PCM signal transmitted through a communication channel or reproduced from a recording medium, comprising:
   a first equalizing means for equalizing the PCM signal so as to decrease intersymbol interferences;
   a clock regenerating means comprising a phase locked loop circuit for regenerating a clock signal synchronized with an output signal of the first equalizing means from a phase of a zero-crossing point of the output signal of the first equalizing means;
   a second equalizing means for subjecting the output signal of the first equalizing means to partial-response equalization so as to cause a specific intersymbol interference to obtain a partial-response equalized signal;
   an amplitude detecting means responsive to the clock signal for detecting an amplitude of the output signal of the first equalizing means at a clock timing of the clock signal; and
   a detecting means responsive to the clock signal for comparing the partial-response equalized signal outputted from the second equalizing means with the amplitude detected by the amplitude detecting means at the clock timing of the clock signal to obtain the digital information.

2. An apparatus according to claim 1, wherein the amplitude detecting means comprises a sampling means for sampling the output signal of the first equalizing means at the clock timing of the clock signal, and an absolute value means for obtaining an absolute value of an output of the sampling means, and a smoothing means for smoothing an output of the absolute value means.

3. A signal detection apparatus for detecting digital information from PCM signal transmitted through a communication channel or reproduced from a recording medium, comprising:

a first equalizing means for equalizing the PCM signal so as to decrease intersymbol interferences;

a clock regenerating means comprising a phase locked loop circuit for regenerating a clock signal synchronized with an output signal of the first equalizing means from a phase of a zero-crossing point of the output signal of the first equalizing means;

an analog-to-digital converting means responsive to the clock signal for sampling and quantizing the output signal of the equalizing means at a clock timing of the clock signal;

a second equalizing means for subjecting an output signal of the analog-to-digital converting means in a form of a digital signal to partial-response equalization so as to cause a specific intersymbol interference to obtain a partial-response equalized signal;

an amplitude detecting means for detecting an amplitude of the output signal of the analog-to-digital converting means; and a detecting means for comparing the partial-response equalized signal outputted from the second equalizing means with the amplitude detected by the amplitude detecting means to obtain the digital information.

4. An apparatus according to claim 3, wherein the amplitude detecting means comprises an absolute value means for obtaining an absolute value of the output signal of the analog-to-digital converting means, and a smoothing means for smoothing an output signal of the absolute value means.

5. A signal detection apparatus for detecting digital information from a PCM signal transmitted through a communication channel or reproduced from a recording medium, comprising:

a first equalizing means for equalizing the PCM signal so as to decrease intersymbol interferences;

a clock regenerating means comprising a phase locked loop circuit for regenerating a clock signal synchronized with an output signal of the first equalizing means from a phase of a zero-crossing point of the output signal of the first equalizing means;

an analog-to-digital converting means responsive to the clock signal for sampling and quantizing the output signal of the equalizing means at a clock timing of the clock signal;

a second equalizing means for subjecting an output signal of the analog-to-digital converting means in a form of a digital signal to partial-response equalization so as to cause a specific intersymbol interference to obtain a partial-response equalized signal;

an amplitude detecting means for detecting an amplitude of the output signal of the analog-to-digital converting means; and a Viterbi decoder for estimating a maximum likelihood of a state transition determined by partial-response equalization from the partial-response equalized signal outputted from the second equalizing means and the amplitude detected by the amplitude detecting means to detect the digital information.

6. An apparatus according to claim 5, wherein the amplitude detecting means comprises an absolute value means for obtaining an absolute value of the output signal of the analog-to-digital converting means, and a smoothing means for smoothing an output signal of the absolute value means.

* * * * *